US011343832B1

(12) United States Patent
Pawar et al.

(10) Patent No.: US 11,343,832 B1
(45) Date of Patent: May 24, 2022

(54) SYSTEMS AND METHODS FOR TRANSMITTING A BEAMFORMED SIGNAL TO A WIRELESS DEVICE PROXIMATE TO AN ANTENNA SYSTEM

(71) Applicant: Sprint Spectrum LP, Overland Park, KS (US)

(72) Inventors: Hemanth Pawar, Brambleton, VA (US); Krishna Sitaram, Chantilly, VA (US); Pratik Kothari, Sterling, VA (US); Chunmei Liu, Great Falls, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 598 days.

(21) Appl. No.: 15/041,392

(22) Filed: Feb. 11, 2016

(51) Int. Cl.
| | | |
|---|---|---|
| H04W 72/08 | (2009.01) | |
| H04W 4/021 | (2018.01) | |
| H04W 4/02 | (2018.01) | |
| H04W 16/28 | (2009.01) | |
| H04W 72/04 | (2009.01) | |

(52) U.S. Cl.
CPC ......... *H04W 72/085* (2013.01); *H04W 4/021* (2013.01); *H04W 4/025* (2013.01); *H04W 16/28* (2013.01); *H04W 72/048* (2013.01); *H04W 72/0413* (2013.01)

(58) Field of Classification Search
CPC ... H04W 72/085; H04W 4/021; H04W 4/025; H04W 72/0413; H04W 16/28; H04W 72/048
See application file for complete search history.

(56) References Cited

U.S. PATENT DOCUMENTS

| | | | |
|---|---|---|---|
| 8,472,968 B1* | 6/2013 | Kim | H04W 52/244 370/232 |
| 8,654,815 B1 | 2/2014 | Forenza et al. | |
| 2008/0200211 A1 | 8/2008 | Hwang et al. | |
| 2008/0279121 A1* | 11/2008 | Englund | H04B 17/336 370/278 |
| 2010/0167664 A1* | 7/2010 | Szini | H04B 7/0617 455/73 |
| 2011/0009105 A1* | 1/2011 | Lee | H01Q 9/0407 455/418 |
| 2011/0249708 A1* | 10/2011 | Maca | H04B 7/15564 375/213 |
| 2013/0331127 A1* | 12/2013 | Sabatelli | H04W 4/021 455/456.3 |
| 2014/0235287 A1* | 8/2014 | Maltsev | H04W 52/267 455/522 |
| 2015/0237618 A1* | 8/2015 | Hanson | H04L 45/245 370/328 |

* cited by examiner

*Primary Examiner* — Noel R Beharry
*Assistant Examiner* — Wilfred Thomas (57) ABSTRACT

Systems and methods are described for transmitting a beamformed signal to a wireless device proximate to an antenna system. An uplink signal may be received at an access node from a wireless device in communication with the access node. It may be detected that the wireless device is proximate to an antenna system, wherein the antenna system does not comprise the access node. The detection may be based on a determined location for the wireless device, an indication from the antenna system, a retrieved signal level metric for the wireless device, and the like. It may be then determined that a beamformed signal is to be transmitted to the wireless device based on the detecting. And the beamformed signal may be transmitted from the access node to the wireless device.

15 Claims, 6 Drawing Sheets

SYSTEMS AND METHODS FOR TRANSMITTING A BEAMFORMED SIGNAL TO A WIRELESS DEVICE PROXIMATE TO AN ANTENNA SYSTEM

TECHNICAL BACKGROUND

Telecommunication systems, such as cellular networks or other wireless networks, rely on multiple network elements to provide reliable services. For example, multiple access points may be located within close proximity to one another. In some configurations, an antenna system (e.g., a distributed antenna system (DAS)) may be deployed to provide wireless services over a geographic area. However, a wireless device proximate to the antenna system that is in communication with a separate access node may interfere with the communications of the antenna system. It may be beneficial for a system to mitigate interference experienced at the antenna system caused by proximate wireless devices.

OVERVIEW

Systems and methods are described for transmitting a beamformed signal to a wireless device proximate to an antenna system. An uplink signal may be received at an access node from a wireless device in communication with the access node. It may be detected that the wireless device is proximate to an antenna system, wherein the antenna system does not comprise the access node. It may be then determined that a beamformed signal is to be transmitted to the wireless device based on the detecting. And the beamformed signal may be transmitted from the access node to the wireless device.

DETAILED DESCRIPTION

Systems and methods are described for transmitting a beamformed signal to a wireless device proximate to an antenna system. For instance, an antenna system, such as a distributed antenna system, may be deployed to provide wireless services to a geographic area. In some embodiments, it may be a given that wireless devices served by the antenna system (e.g., participating wireless devices) are within a predetermined geographic area. In this example, the uplink transmit power for the participating wireless devices may be controlled in view of the known locations for the antennas distributed across the geographic region.

A wireless device proximate to the antenna system that is served by a separate access node (e.g., non-participating wireless device) may interfere with communication between the antenna system and the participating wireless devices. For example, the uplink transmit power for the non-participating wireless device may not be controlled in the manner that the uplink transmit power for the participating wireless devices are controlled. Accordingly, the separate access node may transmit a beamformed signal to the non-participating wireless devices, for instance to increase a signal level metric for the non-participating wireless device (e.g., signal to noise plus interference ratio (SINR), channel quality indicator (CQI), and the like). In some embodiments, based on the increased signal level metric, the non-participating wireless device may reduce the uplink transmit power implemented, and thus the interference at the antenna system may be mitigated.

Figure 1:
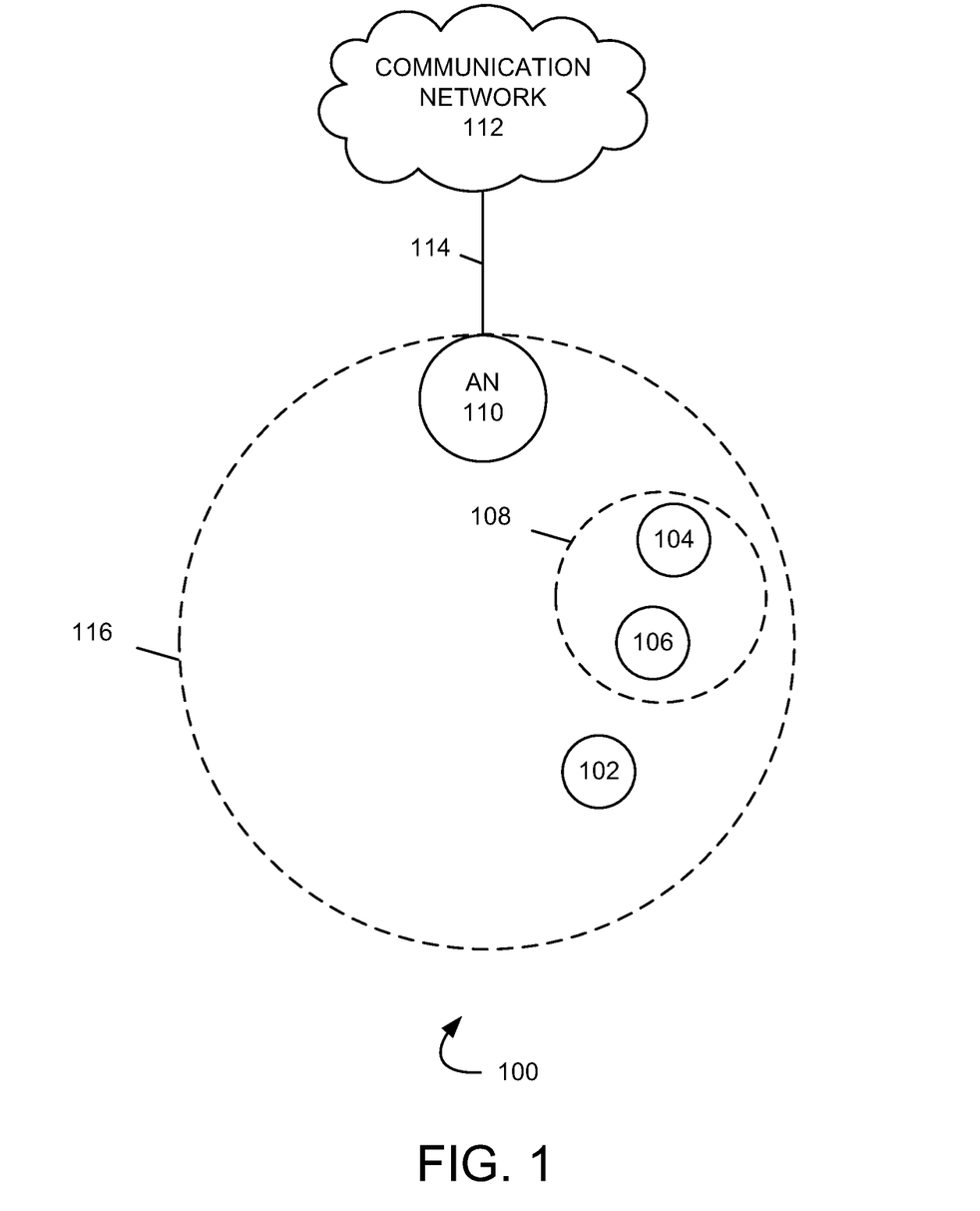
FIG. 1 illustrates an exemplary communication system to transmit a beamformed signal to a wireless device proximate to an antenna system.

FIG. 1 illustrates an exemplary communication system 100 to transmit a beamformed signal to a wireless device proximate to an antenna system comprising wireless devices 102, 104, and 106, antenna system 108, access node 110, communication network 112, communication link 114, and coverage area 116. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between antenna system 108, access node 110, and communication network 112 which are omitted for clarity, including additional processing nodes, routers, gateways, and physical and/or wireless data links for carrying data among the various network elements.

Wireless devices 102, 104, and 106 can be any device configured to communicate over communication system 100 using a wireless communication link. For example, wireless devices 102, 104, and 106 can include a cell phone, a smart phone, a computing platform such as a laptop, palmtop, or a tablet, a personal digital assistant, relay communication device, or an internet access device, and combinations thereof. It is noted that while three wireless devices are illustrated in FIG. 1 as being in communication with the depicted access node and antenna system, any number of wireless devices can be implemented.

Antenna system 108 may comprise any configuration of antennas or access points configured to provide wireless devices (e.g., wireless devices 104 and 106) access to a communication network (e.g., communication network 112) within a geographic area. For example, antenna system 108 may comprise a distributed antenna system (DAS) or any other suitable configured antenna system or array distributed across a predetermined geographic space. In some embodiments, antenna system 108 may comprise one or more filters (e.g., low pass filters), one or more repeaters, one or more amplifiers, and any other suitable components.

Access node 110 is a network node capable of providing wireless communication to wireless device 102, and can be, for example, a base transceiver station, a radio base station, an eNodeB device, a small cell (i.e. pico node, femto node, and the like), or any other suitable network element. Access node 110 may communicate with communication network 112 over communication link 114. Although only one access nodes is illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 112 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 112 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 112 may also comprise a wireless network, including base stations, wireless communication nodes, telephony switches, internet routers, network gateways, computer systems, communication links, or some other type of communication equipment, and combinations thereof.

Communication link 114 can be a wired or wireless communication link. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 110 may establish communication with wireless device 102 such that access node 110 provides the wireless device access to a communication network (e.g., communication network 112). Similarly, antenna system 108 may establish communication with wireless devices 104 and 106 such that antenna system 108 provides the wireless devices access to a communication network (e.g., communication network 112).

In an embodiment, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 110 may comprise coverage area 116. For example, a coverage area may be the area around an access node or cell where a wireless device may detect wireless signals transmitted from the node or cell (e.g., detect signals at a signal level above a threshold). Antenna system 108 may overlap with coverage area 116.

In some embodiments, access node 110 may implement a beamforming protocol. For example, beamforming may be accomplished using a plurality of antennas at an access node that implements, for example, a multiple input multiple output (MIMO) protocol. The signals from each of the plurality of antennas may be controlled such that the net signal from the access node may be transmitted towards a wireless device as a beamformed signal. In an embodiment, the beam may be formed by weighting the magnitude and/or phase of the signals transmitted by each individual antenna. For example, the signals may be weighted such that the emitted waveform from the antennas experiences constructive interference in the direction of the wireless device.

In an embodiment, communication between wireless device 102 and access node 110 may cause interference over antenna system 108. In some embodiments, it may be a given that wireless devices 104 and 106, wireless devices served by the antenna system (e.g., participating wireless devices), are within a predetermined geographic area (e.g., a predetermined geographic area covered by antenna system 108). In this example, the uplink transmit power for the participating wireless devices (e.g., wireless device 104 and 106) may be controlled in view of the known locations for the antennas distributed across the geographic region. For instance, the participating wireless device may be instructed to use an uplink transmit power that is lower than the power used for normal communication with an access node.

Communication between access node 110 and wireless device 102 (e.g., non-participating wireless device) may interfere with communication between antenna system 108 and the participating wireless devices. For example, the uplink transmit power for wireless device 102 may not be controlled in the manner that the uplink transmit power for the participating wireless devices are controlled, and thus uplink transmission from wireless device 102 may overload antenna system 108. Accordingly, it may be beneficial for a system to mitigate interference experienced at an antenna system caused by proximate wireless devices.

Figure 2:
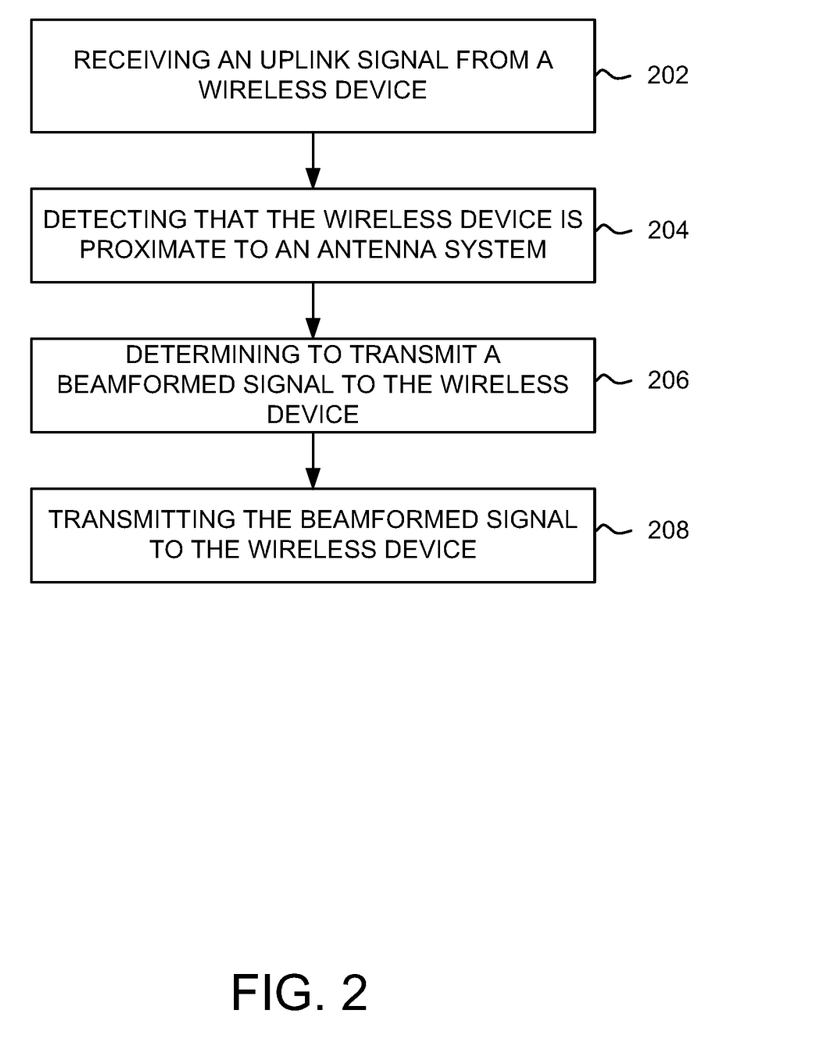
FIG. 2 illustrates an exemplary method for transmitting a beamformed signal to a wireless device proximate to an antenna system.

FIG. 2 illustrates an exemplary method for transmitting a beamformed signal to a wireless device proximate to an antenna system according to an embodiment. The method will be discussed with reference to the exemplary communication system 100 illustrated in FIG. 1, however, the method can be implemented with any suitable communication system.

Referring to FIG. 2, at step 202, an uplink signal may be received at an access node from a wireless device in communication with the access node. For example, access node 110 may be in communication with wireless device 102. Wireless device 102 may receive downlink transmissions from access node 110 and access node 110 may receive uplink transmissions from wireless device 102.

At step 204, it may be detected that the wireless device is proximate to an antenna system, wherein the antenna system does not comprise the access node. For example, it may be detected that wireless device 102 is proximate to antenna system 108. The detection may be based on a signal level metric for wireless device 102, a determined location for wireless device 102, and any other suitable information.

At step 206, it may be determined that a beamformed signal is to be transmitted to the wireless device based on the detecting. For example, it may be determined that a beamformed signal is to be transmitted from access node 110 to wireless device 102.

At step 208, a beamformed signal may be transmitted from the access node to the wireless device. For example, based on the determination, access node 110 may transmit a beamformed signal to wireless device 102.

Figure 3:
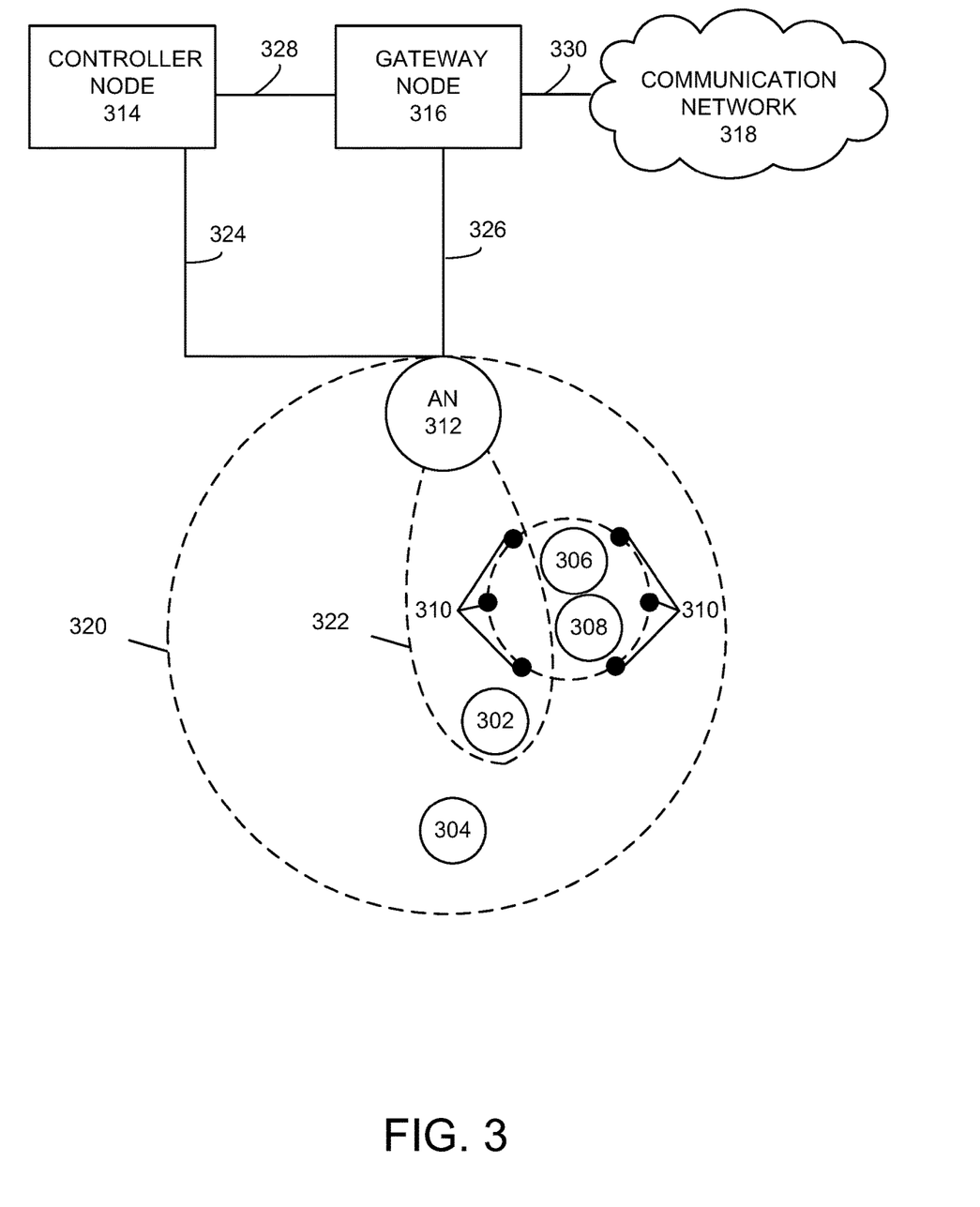
FIG. 3 illustrates another exemplary communication system to transmit a beamformed signal to a wireless device proximate to an antenna system.

FIG. 3 illustrates another exemplary communication system 300 to transmit a beamformed signal to a wireless device proximate to an antenna system. Communication system 300 may comprise wireless devices 302, 304, 306, and 308, antenna system 310, access node 312, controller node 314, gateway node 316, communication network 318, coverage area 320, beamformed signal 322, and communication links 324, 326, 328, and 330. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302, 304, 306, and 308 can be any device configured to communicate over communication system 300 using a wireless communication link. For example, wireless device 302, 304, 306, and 308 can include a cell phone, a smart phone, a computing platform such as a laptop, palmtop, or a tablet, a personal digital assistant, relay communication device, or an internet access device, and combinations thereof.

Antenna system 310 may comprise any configuration of antennas or access points configured to provide wireless devices (e.g., wireless devices 306 and 308) access to a communication network (e.g., communication network 318) within a geographic area. For example, antenna system 310 may comprise a distributed antenna system (DAS) or any other suitable configured antenna system or array distributed across a predetermined geographic space. In some embodiments, antenna system 310 may comprise one or more filters (e.g., low pass filters), one or more repeaters, one or more amplifiers, and any other suitable components.

Access nodes 312 is a network node capable of providing wireless communication to wireless devices 302 and 304, and can be, for example, a base transceiver station, a radio base station, an eNodeB device, a small cell (i.e. pico node, femto node, and the like), or any other suitable network element. In an embodiment, access node 312 can comprise a serving access node for wireless device 302. Access node 312 may communicate with controller node 314 over communication link 324, and with gateway node 316 over communication links 326. Although only one access node and antenna system are illustrated in FIG. 3, wireless 302, 304, 306, and 308 (and other wireless device not depicted) can be in communication with a plurality of access nodes and/or small cells. The plurality of access nodes and/or small cells can be associated with different networks and can support different communication protocols and radio access technologies.

Controller node 314 can be any network node configured to manage services within system 300. Controller node 314 may provide other control and management functions for system 300. The controller node 314 can be a single device having various functions or a plurality of devices having differing functions. For example, controller node 314 can include at least one of a multi-cell/multicast coordination entity (MCE), a mobility management entity (MME), a radio network controller (RNC), a mobile switching center (MSC), and a combination thereof.

Controller node 314 can comprise a processor and associated circuitry to execute or direct the execution of computer-readable instructions to obtain information. Controller node 314 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 314 can receive instructions and other input at a user interface. Controller node 314 can comprise a processor and associated circuitry to execute or direct the execution of computer-readable instructions to obtain information.

Gateway node 316 is a network element which can comprise a processor and associated circuitry to execute or direct the execution of computer-readable instructions. Gateway node 316 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 316 can provide instructions to access node 312 related to channel selection in communications with wireless devices. For example, gateway node 316 can comprise at least one of a serving gateway (SGW), a packet data network gateway (PDNGW), a cellular gateway (CGW), and a combination thereof.

Communication network 318 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 318 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 318 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 324, 326, 328, and 330 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 312, controller node 314, gateway node 316, and communication network 318 which are omitted for clarity, including additional processing nodes, routers, gateways, and physical and/or wireless data links for carrying data among the various network elements. In an embodiment, any of controller node 314, gateway node 316, and one or more modules of access node 312, may perform all or parts of the methods of FIGS. 2, 4, and 5.

In operation, access node 312 may establish communication with wireless devices 302 and 304 such that access node 312 provides the wireless devices access to a communication network (e.g., communication network 318). Similarly, antenna system 310 may establish communication with wireless devices 306 and 308 such that antenna system 310 provides the wireless devices access to a communication network (e.g., communication network 318).

In an embodiment, access node 312 may comprise coverage area 320. For example, a coverage area may be the area around an access node or cell where a wireless device may detect wireless signals transmitted from the node or cell (e.g., detect signals at a signal level above a threshold). Antenna system 310 may overlap with coverage area 320.

In an embodiment, system 300 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In some embodiments, access node 312 may implement a beamforming protocol. For example, beamforming may be accomplished using a plurality of antennas at an access node that implements, for example, a multiple input multiple output (MIMO) protocol. The signals from each of the plurality of antennas may be controlled such that the net signal from the access node may be transmitted towards a wireless device as a beamformed signal. In an embodiment, the beam may be formed by weighting the magnitude and/or phase of the signals transmitted by each individual antenna. For example, the signals may be weighted such that the emitted waveform from the antennas experiences constructive interference in the direction of the wireless device.

In an embodiment, communication between wireless device 302 and access node 312 may cause interference at antenna system 310. In some embodiments, it may be a given that wireless devices 306 and 308, wireless devices served by antenna system 310 (e.g., participating wireless devices), are within a predetermined geographic area (e.g., a predetermined geographic area covered by antenna system 310). In this example, the uplink transmit power for the participating wireless devices (e.g., wireless device 306 and 308) may be controlled in view of the known locations for the antennas distributed across the geographic region. For instance, the participating wireless device may be instructed to use an uplink transmit power that is lower than the power used for normal communication with an access node.

In an embodiment, communication between access node 312 and wireless device 302 (e.g., non-participating wireless device) may interfere with communication between antenna system 310 and the participating wireless devices. For example, the uplink transmit power for wireless device 302 may not be controlled in the manner that the uplink transmit power for the participating wireless devices are controlled, and thus uplink transmission from wireless device 302 may overload antenna system 310. On the other hand, wireless device 304 may also be in communication with access node 312 and may also comprise a non-participant wireless device. However, wireless device 304 may not be proximate to the antenna system, and thus may not cause interference at antenna system 310. Accordingly, it may be beneficial for a system to mitigate interference experienced at an antenna system caused by proximate wireless devices.

Figure 4:
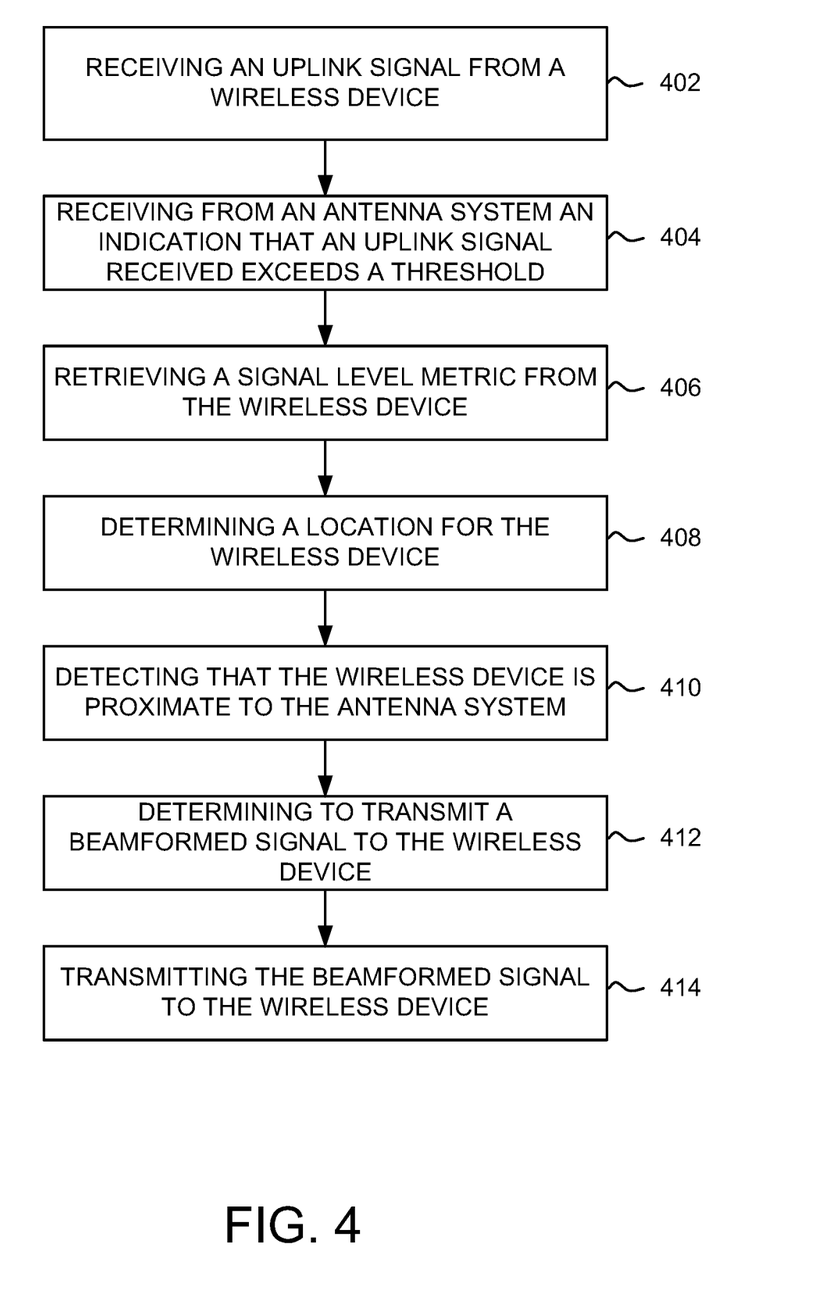
FIG. 4 illustrates another exemplary method for transmitting a beamformed signal to a wireless device proximate to an antenna system.

FIG. 4 illustrates an exemplary method for transmitting a beamformed signal to a wireless device proximate to an antenna system according to an embodiment. The method will be discussed with reference to the exemplary communication system 100 illustrated in FIG. 3, however, the method can be implemented with any suitable communication system.

Referring to FIG. 4, at step 402, an uplink signal may be received at an access node from a wireless device in communication with the access node. For example, access node 312 may be in communication with wireless device 302. Wireless device 302 may receive downlink transmissions from access node 312 and access node 312 may receive uplink transmissions from wireless device 302.

At step 404, an indication may be received from the antenna system that indicates uplink signals received at the antenna system exceed a signal level threshold. For example, antenna system 310 may communicate with wireless devices 306 and 308 (e.g., participating wireless devices). The antenna system may be configured such that an uplink power for the wireless devices communicating over the antenna system is controlled. For example, antenna system 310 may comprise a conventional distributed antenna system (DAS).

In an embodiment, antenna system 310 may instruct participating wireless devices to communicate with the antenna system using a predetermined uplink power level. Based on the known geographic space and distances for the antenna system, and the known presence of antennas across the geographic space, it may be a given that a certain uplink power level may be sufficient for participating wireless devices to communicate with antenna system 310. Accordingly, the predetermined uplink power level may be calculated such that it is sufficient for participating wireless devices to communicate with antenna system 310 while they are located in the designated geographical space. In an embodiment, the antenna system may also implement a predetermined downlink power level based on the known conditions discussed herein for communication with participating wireless devices.

In an embodiment, the predetermined uplink power level may be less than a power level used by a wireless device when communicating with an access node that is not part of antenna system 310 (e.g., less than an uplink power level used by wireless device 302 to communicate with access node 312). For instance, because the communication between wireless device 302 and access node 312 does not benefit from the same known parameters (e.g., known geographical space and known antennas across the geographical space) the uplink power used by wireless device 302 may be greater than the uplink power used by the participating wireless device. In an embodiment, an implemented predetermined downlink power level for antenna system 310 may similarly be less than the implemented downlink power level used by an access node to communicate with wireless devices (e.g., used by access node 312 to communicate with wireless device 302).

In some embodiments, a signal received by an antenna of antenna system 310 may exceed a signal level threshold for the antenna system. For example, based on the predetermined uplink power level (and/or predetermined downlink power level), a signal level threshold may be set for received signals at antenna system 310. The signal level threshold may be set by a network administrator, or may be dynamic based on the configuration of wireless devices within the geographic area designated for antenna system 310. In an embodiment, a signal received at antenna system 310 may exceed such a threshold, for instance an uplink signal received from wireless device 302 when the wireless device is communicating with access node 312. In other embodiments, the received signal may be from some other source. Antenna system 310 may communicate with access node 312 to indicate that such a signal has been received.

In an embodiment, when antenna system 310 receives a signal that is greater than the threshold, the system may implement automatic gain control (AGC). For example, antenna system 310 may comprise a DAS that implements AGC when a signal is received that exceeds a predetermined threshold to maintain system performance for participating wireless devices (e.g., mitigate service degradation in view of the received signal). For instance, AGC can be used to lower the power of the received signal that exceeds the signal level threshold and thus mitigate against service degradation. However, when implemented, AGC can affect both the received power for signals from the non-participant wireless device (e.g., wireless device 302) and the participant wireless devices (e.g., wireless devices 306 and 308). Accordingly, a non-participant wireless device triggering AGC at antenna system 310 can reduce the quality of wireless services for participant wireless devices. In an embodiment, the indication from antenna system 310 may comprise an indication that AGC has been triggered at the antenna system.

In an embodiment, antenna system 310 may transmit the indication to access nodes proximate to the antenna system. For instance, antenna system 310 may manage a neighbor list, similar to a neighbor list that is maintained at access nodes (e.g., (neighbor relations table (NRT)). In an embodiment, the neighbor list may be populated by a network administrator, based on an automatic neighbor relations (ANR) protocol that leverages wireless devices in communication with antenna system 310, or in any other suitable manner. In an embodiment, antenna system 310 may transmit an indication that indicates uplink signals received at the antenna system exceed a signal level threshold to neighbors of the antenna system (e.g., access nodes determined to be proximate to the antenna system based on their inclusion on a neighbor list for the antenna system). The indication may comprise a message, or any other suitable indication.

At step 406, a signal level metric for the wireless device may be retrieved. For example, when communicating with access node 312, wireless device 302 may comprise a signal level metric. The signal level metric may comprise a received signal level metric for a signal received from access node 312 (e.g., received signal to noise plus interference ratio (SINR), received signal strength indicator (RSSI), reference signal received quality (RSRQ), received signal received power (RSRP), and the like) channel quality indicator (CQI), or any other suitable signal level metric. In an embodiment, the retrieved signal level metric may be used to determine whether to transmit a beamformed signal from access node 312 to wireless device 302.

At step 408, a location may be determined for the wireless device. For example, a location for wireless device 302 may be determined. The wireless device may communicate with a GPS system, and the GPS system may be used to determine the location. In another embodiment, signal triangulation may be used to determine a location. For example, a wireless device may receive signals from a plurality of access nodes (e.g. reference signals) or from the antenna system 310 at different signal levels. Based on the received signal levels, a distance from each access node or the antenna system may be determined. Accordingly, using the determined distances from each access node or the antenna system, a location may be determined for the wireless device. A location may also be determined in any other suitable manner. In an embodiment, the determined location may be used to determine whether to transmit a beamformed signal from access node 312 to wireless device 302.

At step 410, it may be detected that the wireless device is proximate to an antenna system, wherein the antenna system does not comprise the access node. For example, it may be detected that wireless device 302 is proximate to antenna system 310, where wireless device 302 is in communication with access node 312 and antenna system 310 does not comprise access node 312 (e.g., access node 312 is not a part of antenna system 310). The detection may be based on an indication received from antenna system 310, a signal level metric for wireless device 302, a determined location for wireless device 302, and any other suitable information. In another embodiment, the detection that wireless device 302 is proximate to antenna system 310 may further indicate that wireless device 302 is within a threshold distance from antenna system 310, that wireless device 302 is within a threshold distance from (or proximate to) a geographical space associated with antenna system 310, or may indicate any other suitable proximity between wireless device 302 and antenna system 310.

In an embodiment, an indication may be received from antenna system 310 that indicates uplink signals received at the antenna system exceed a signal level threshold. For example, one or more antenna of antenna system 310 may receive signals from one or more sources (e.g., wireless device 302) that exceed a predetermined threshold for a received signal level. In an embodiment, it may be detected that wireless device 302 is proximate to antenna system 310 based on the received indication from antenna system 310. For example, based on known location for access node 312 and antenna system 310, it may be determined that a wireless device in communication with access node 312 is a source of signals received at antenna system 310 that exceed the predetermined threshold.

In an embodiment, a signal level metric for wireless device 302 may be retrieved. For example, the signal level metric may comprise a received signal level metric for a signal received from access node 312, a CQI, or the like. The retrieved signal level metric may be compared to a signal level metric criteria. For example, the signal level metric criteria may comprise a predetermined signal level metric value or range of values (e.g., SINR or CQI value or range of values), wherein comparison with the criteria indicates that wireless device 302 is proximate to antenna system 310. In an embodiment, it may be detected that wireless device 302 is proximate to antenna system 310 based on the retrieved signal level metric and the received indication from antenna system 310.

For example, based on known location for access node 312 and antenna system 310, it may be determined that a wireless device in communication with access node 312 is a source of signals received at antenna system 310 that exceed the predetermined threshold. In addition, based on the retrieved signal level metric for wireless device 302, it may be determined that wireless device 302 is the particular wireless device (or one of the particular wireless devices) in communication access node 312 that is the source of the received signals at antenna system 310 that exceed the predetermined threshold.

In another embodiment, it may be detected that wireless device 302 is proximate to antenna system 310 based on the retrieved signal level metric, a sector or carrier of access node 312 that is in communication with wireless device 302, and the received indication from antenna system 310. For example, access node 312 may be divided into one or more sectors, for instance three sectors that comprise 120° arcs of coverage area 320. A predetermined sector of access node 312 may comprise coverage that overlaps with antenna system 310. Accordingly, it may be detected that wireless device 302 is proximate to antenna system 310 when wireless device 302 is served by a predetermined sector of access node 312.

In an embodiment, access node 312 may comprise a number of carriers. For example, a first carrier used by access node 312 to provide wireless services may comprise a first coverage area and a second carrier used by access node 312 to provide wireless services may comprise a second coverage area, where the first coverage area is different in size from the second coverage area. In an embodiment, depending on the carrier used by wireless device 302 to communicate with access node 312, the wireless device may be detected to be proximate to antenna system 310.

For example, the signal level metric criteria that may comprise a predetermined signal level metric value or range of values (e.g., SINR or CQI value or range of values) may be based on the carrier used to communicate with wireless device 302. For example, a first value or range of values may indicate that a wireless device communicating over a first carrier is proximate to antenna system 310 and a second value or range of values may indicate that a wireless device communicating over a second carrier is proximate to antenna system 310. Accordingly, the comparison between predetermined signal level metric and the retrieved signal level metric may be based on the carrier used by wireless device 302 to communicate with access node 310. In an embodiment, it may be detected that wireless device 302 is proximate to antenna system 310 based on a comparison between the signal level metric and the signal level metric criteria, the signal level metric criteria being based on a carrier used by wireless device 302 to communicate with access node 312.

In an embodiment, a location for wireless device 302 may be determined. For example, the location may be determined based on GPS, signal triangulation, or in any other suitable manner. In an embodiment, a predetermined location for antenna system 310 may be compared to the determined location for wireless device 302, and it may be detected that wireless device 302 is proximate to antenna system 310 based on the comparison.

At step 412, it may be determined that a beamformed signal is to be transmitted to the wireless device based on the detecting. For example, it may be determined that a beamformed signal is to be transmitted from access node 312 to wireless device 302.

In an embodiment, it may be determined that a beamformed signal is to be transmitted from access node 312 to wireless device 302 when a retrieved signal level metric for wireless device 302 meets a criteria. In an embodiment, a signal level metric for wireless device 302 may be retrieved. For example, the signal level metric may comprise a received signal level metric for a signal received from access node 312, a CQI, or the like. The retrieved signal level metric may be compared to a criteria. For example, the criteria may comprise a predetermined signal level metric value or range of values (e.g., SINR or CQI value or range of values), wherein comparison with the criteria indicates that uplink transmissions from wireless device 302 are capable of interfering with communication at antenna system 310.

In an embodiment, it may be determined that a beamformed signal is to be transmitted from access node 312 to wireless device 302 when an uplink transmit power for wireless device 302 meets a transmit power criteria. For example, access node 312 may instruct wireless device 302 to transmit uplink transmissions with a predetermined power level (e.g., based on a signal level metric for the wireless device). The predetermined power level may be compared to a criteria. For example, the criteria may comprise a power level value or range of values (e.g., SINR or CQI value or range of values), wherein comparison with the criteria indicates that uplink transmissions from wireless device 302 are capable of interfering with communication at antenna system 310.

At step 414, a beamformed signal may be transmitted from the access node to the wireless device. For example, based on the determination, access node 312 may transmit a beamformed signal to wireless device 302. In an embodiment, access node 312 may instruct wireless device 302 to transmit a sounding reference signal (SRS). Based on detection of the SRS, access node 312 may implement weights to a transmitted waveform according to a MIMO protocol such that beamformed signal 322 is transmitted towards wireless device 302. In an embodiment, access node 312 may continue to transmit beamformed signal 322 to wireless device 302 until the wireless device is no longer proximate to antenna system 310, the wireless device is handed over from access node 312, or the wireless device begins communicating with antenna system 310.

In an embodiment, based on the beamformed signal, a signal level metric for wireless device 302 may be increased (e.g., SINR for a signal received from access node 312 or CQI). In some examples, based on the increased signal level metric, an uplink transmission power for wireless device 302 may be decreased. Accordingly, antenna system 310 may no longer receive uplink signals that exceed the predetermined threshold, or the antenna system may see a reduction in signals received that exceed the predetermined threshold.

Figure 5:
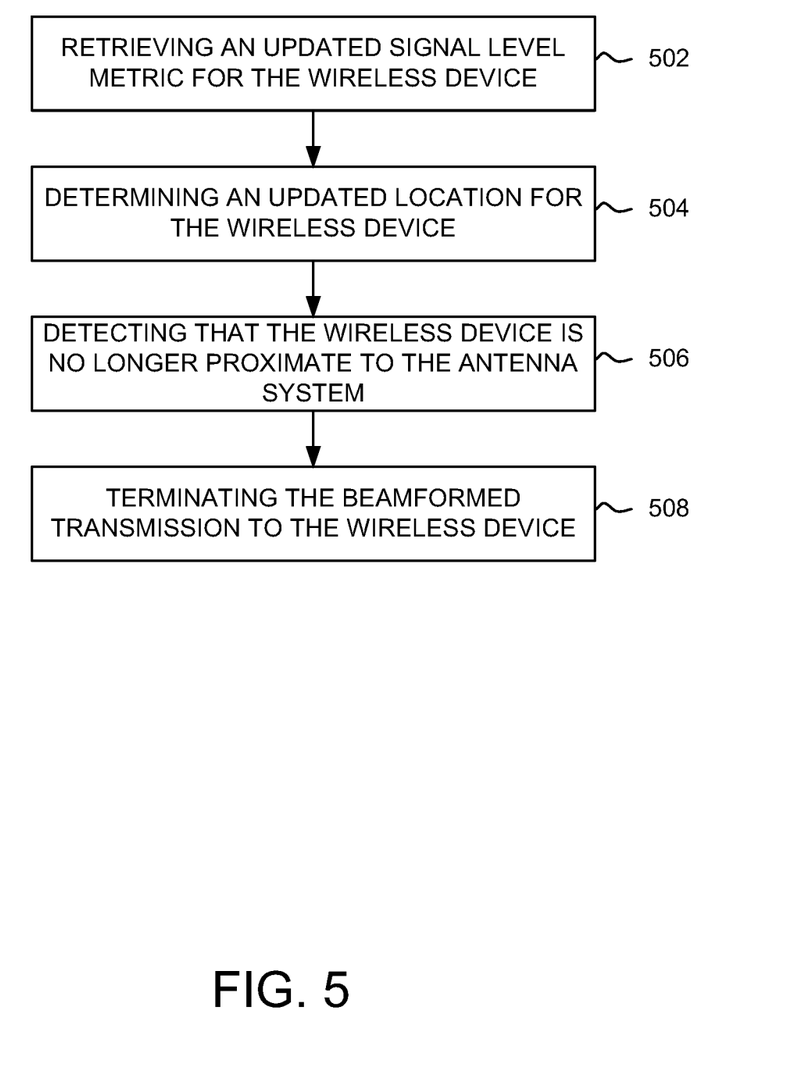
FIG. 5 illustrates an exemplary method for terminating a beamformed transmission to a wireless device.

FIG. 5 illustrates an exemplary method for terminating a beamformed transmission to a wireless device according to an embodiment. The method of FIG. 5 may be performed in combination with or after performance of the method of FIG. 4. The method will be discussed with reference to the exemplary communication system 300 illustrated in FIG. 3, however, the method can be implemented with any suitable communication system.

Referring to FIG. 5, at step 502, an updated signal level metric for the wireless device may be retrieved. For example, the updated signal level metric for wireless device 302 may comprise a received signal level metric for a signal received from access node 312, a CQI, or the like. In an embodiment, the updated signal level metric may be retrieved after access node 312 transmits a beamformed signal to wireless device 302.

At step 504, an updated location may be determined for the wireless device. For example, an updated location may be determined for wireless device 302. In an embodiment, the updated location may be determined based on GPS, signal triangulation, or in any other suitable manner.

At step 506, it may be detected that the wireless device is no longer proximate to the antenna system. For example, it may be determined that wireless device 302 is no longer proximate to antenna system 310.

In an embodiment, the updated signal level metric may be compared to a signal level metric criteria. For example, the signal level metric criteria may comprise a predetermined signal level metric value or range of values (e.g., SINR or CQI value or range of values), wherein comparison with the criteria indicates whether wireless device 302 is proximate to antenna system 310. In an embodiment, it may be detected that wireless device 302 is no longer proximate to antenna system 310 based on the updated signal level metric.

In an embodiment, it may be detected that wireless device 302 is no longer proximate to antenna system 310 based on the updated signal level metric and a sector or carrier of access node 312 that is in communication with wireless device 302. For example, access node 312 may be divided into one or more sectors, for instance three sectors that comprise 120° arcs of coverage area 320. A predetermined sector of access node 312 may comprise coverage that overlaps with antenna system 310 while other sectors of access node 312 do not overlap with antenna system 310. Accordingly, it may be detected that wireless device 302 is no longer proximate to antenna system 310 when wireless device 302 is served by a sector of access node 312 other than the predetermined sector.

In an embodiment, access node 312 may comprise a number of carriers. For example, a first carrier used by access node 312 to provide wireless services may comprise a first coverage area and a second carrier used by access node 312 to provide wireless services may comprise a second coverage area, where the first coverage area is different in size from the second coverage area. In an embodiment, depending on the carrier used by wireless device 302 to communicate with access node 312, the wireless device may be detected to be proximate to antenna system 310.

For example, the signal level metric criteria that comprises a predetermined signal level metric value or range of values (e.g., SINR or CQI value or range of values) may be based on the carrier used to communicate with wireless device 302. For example, a first value or range of values may indicate that a wireless device communicating over a first carrier is proximate to the antenna system 310 and a second value or range of values may indicate that a wireless device communicating over a second carrier is proximate to the antenna system 310. Accordingly, the comparison between predetermined signal level metric and the updated signal level metric may be based on the carrier used by wireless device 302 to communicate with access node 310. In an embodiment, it may be detected that wireless device 302 is no longer proximate to antenna system 310 based on a comparison between the updated signal level metric and the signal level metric criteria, the signal level metric criteria being based on a carrier used by wireless device 302 to communicate with access node 312.

In an embodiment, an updated location for wireless device 302 may be determined. For example, the updated location may be determined based on GPS, signal triangulation, or in any other suitable manner. In an embodiment, a predetermined location for antenna system 310 may be compared to the updated location for wireless device 302, and it may be detected that wireless device 302 is no longer proximate to antenna system 310 based on the comparison.

At step 508, the beamformed signal transmitted from the access node to the wireless device may be terminated. For example, based on the detection, access node 312 may terminate transmission of beamformed signal 322 to wireless device 302.

In an embodiment, based on the detection that wireless device 302 is no longer proximate to antenna system 310, it may be determined that wireless device 302 will no longer transmit uplink signals that interfere with antenna system 310 when returning to a non-beamformed signal transmission.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
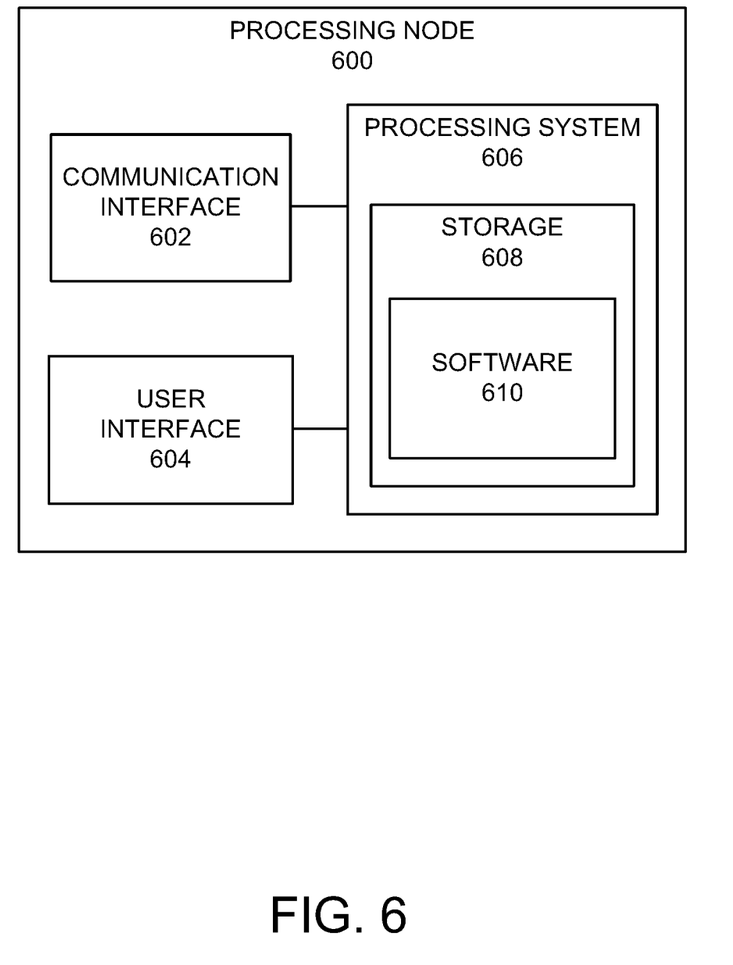
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 314 and gateway node 316. Processing node 600 can also be an adjunct or component of a network element, such as an element of access node 110, access node 312, and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for transmitting a beamformed signal to a wireless device proximate to an antenna system, the method comprising:
   receiving an uplink signal at an access node from a wireless device in communication with the access node;
   receiving an indication from the antenna system that indicates uplink signals received at the antenna system exceed a signal level threshold;
   retrieving a signal level metric for the wireless device from the received uplink signal;
   detecting that the wireless device is within a predetermined distance from an antenna system based on the retrieved signal level metric and on the received indication, wherein the antenna system does not comprise the access node; and
   in response to detecting that the wireless device is within the predetermined distance from the antenna system, transmitting a beamformed signal from the access node to the wireless device.

2. The method of claim 1, wherein,
   the antenna system is in communication with a plurality of participant wireless devices and the wireless device in communication with the access node comprises a non-participant wireless device, and
   the detecting that the wireless device is within a predetermined distance from the antenna system is further based on the signal level metric meeting a criteria, the criteria comprises an uplink transmit power for the non-participant wireless device used to transmit the uplink signal received at the access node is greater than an uplink transmit power for the participant wireless devices.

3. The method of claim 2, wherein the signal level metric comprises a channel quality indicator.

4. The method of claim 1, wherein detecting that the wireless device is within a predetermined distance from an antenna system further comprises:
   determining a location for the wireless device based on the signal level metric of signals received at the wireless device; and
   detecting that determined the location of the wireless device is within the predetermined distance from the antenna system.

5. The method of claim 1, further comprising:
   detecting, after transmitting the beamformed signal, that the wireless device is no longer within the predetermined distance from the antenna system; and
   terminating the beamformed transmission from the access node to the wireless device.

6. The method of claim 5, wherein detecting that the wireless device is no longer within the predetermined distance from the antenna system further comprises:
   retrieving a second signal level metric for the wireless device; and
   detecting that the wireless device is no longer within the predetermined distance from the antenna system based on the retrieved second signal level metric.

7. The method of claim 5, wherein detecting that the wireless device is no longer within the predetermined distance from the antenna system further comprises:
   determining a location for the wireless device based on signals received at the wireless device; and
   detecting that the wireless device is outside the predetermined distance from the antenna system based on the determined location.

8. The method of claim 1, wherein the antenna system comprises a distributed antenna system and the access node comprises a macro access node.

9. A system for transmitting a beamformed signal to a wireless device proximate to an antenna system, the system comprising:
   an access node with a processor configured to:
      receive an uplink signal from a wireless device in communication with the access node;
      retrieve a signal level metric for the wireless device from the received uplink signal;
      detect that the wireless device is within a predetermined distance from an antenna system based on the retrieved signal level metric, wherein the antenna system does not comprise the access node; and
      in response to detecting that the wireless device is within the predetermined distance from the antenna system, transmit a beamformed signal from the access node to the wireless device.

10. The system of claim 9, wherein,
    the antenna system is in communication with a plurality of participant wireless devices and the wireless device in communication with the access node comprises a non-participant wireless device, and
    the detecting that the wireless device is within a predetermined distance from the antenna system is further based on the signal level metric meeting a criteria, the criteria comprises an uplink transmit power for the non-participant wireless device used to transmit the uplink signal received at the access node is greater than an uplink transmit power for the participant wireless devices.

11. The system of claim 10 wherein the signal level metric comprises a channel quality indicator.

12. The system of claim 9, wherein the access node is further configured to:
    receive an indication from the antenna system that indicates uplink signals received at the antenna system exceed a signal level threshold; and
    wherein detecting that the wireless device is within the predetermined distance from the antenna system is further based on the received indication.

13. The system of claim 9, wherein detecting that the wireless device is within the predetermined distance from the antenna system further comprises:

determining a location for the wireless device based on the signal level metric of signals received at the wireless device; and     detecting that the determined location of the wireless device is within the predetermined distance from the antenna system.

14. The system of claim 9, wherein the access node is further configured to:

detect, after transmitting the beamformed signal, that the wireless device is no longer within the predetermined distance from the antenna system; and     terminate the beamformed transmission from the access node to the wireless device.

15. The system of claim 9, wherein the antenna system comprises a distributed antenna system and the access node comprises a macro access node.

\* \* \* \* \*